Patented Aug. 25, 1925.

1,551,147

UNITED STATES PATENT OFFICE.

ARTHUR GEORGE GREEN, KENNETH HERBERT SAUNDERS, AND ERNEST BRYAN ADAMS, OF MANCHESTER, ENGLAND.

QUINONIMIDE DYESTUFFS AND THE PROCESS OF MAKING THE SAME.

No Drawing. Application filed April 4, 1922. Serial No. 549,546.

*To all whom it may concern:*

Be it known that we, ARTHUR GEORGE GREEN, KENNETH HERBERT SAUNDERS, and ERNEST BRYAN ADAMS, all of Crumpsall Vale Chemical Works, Blackley, Manchester, England, all subjects of the King of Great Britain and Ireland, have invented certain new and useful Improvements in Quinonimide Dyestuffs and the Process of Making the Same, of which the following is a specification.

In the British Patent No. 181,750, of June 19, 1922, we have described a new series of acid-dyeing colouring matters and of intermediate components therefor, which are characterized by the presence of the sulphatoethyl group—$C_2H_4.SO_4H$—attached to nitrogen. These dyestuffs and dyestuff-components are obtained by the action of sulphuric acid upon the corresponding hydroxyethyl compounds, the latter being produced by condensation of ethylene chlorhydrin with amido bodies.

In the complete specification of the said British Patent No. 181,750 we have further shown that colouring-matters and intermediates containing the sulphatopropyl—$C_3H_6.SO_4H$, sulphatobutyl—$C_4H_8.SO_4H$, or analogous group, are also obtainable by similar reactions using other chlorhydrins, and likewise have acid-dyeing properties.

In the course of our investigations in this field we have invented a number of new colouring-matters and intermediates containing the hydroxyethyl, hydroxypropyl, hydroxybutyl or analogous group, which on treatment with sulphuric acid are readily converted into the sulphato compounds which are soluble acid dyestuffs which split off $H_2SO_4$ upon hydrolysis. These are not merely useful for conversion into sulphato compounds, but are in themselves useful dyestuffs or components for dyestuffs, offering advantages over the corresponding alkylated compounds not only in ease of manufacture but also in their properties.

The present invention relates to the manufacture of such hydroxyalkylated dyestuffs, as possess a quinonimide structure. Such dyestuffs may possess basic properties or may contain sulphonic acid or mordant dyeing groups the constitution of which can be seen from the formula

in which "A" stands for nitrogen, oxygen or sulphur. The constitution of all quinonimide dyestuffs can be derived from the above formula by addition of various substituents and in particular in our new dyestuffs, there are one or more amino groups with an hydroxyalkyl group attached. They are obtained by applying the standard reactions for the preparation of oxazines, thiazines or azines, to intermediates containing one or more oxyalkyl groups attached to nitrogen.

The standard reactions for the manufacture of oxazine dyestuffs are as follows: A nitroso derivative of an hydroxyalkyl-arylamine or of an hydroxyalkyl-alkyl-arylamine may be condensed with a phenolic compound; or a nitroso derivative of a m-hydroxy-hydroxyalkyl-arylamine or of a m-hydroxy-hydroxyalkyl-alkyl-arylamine may be condensed with an arylamine, with an alkyl-arylamine, with an hydroxyalkyl-arylamine, or with an hydroxalkyl-alkyl-arylamine. Or again, the nitroso derivative of an alkyl-arylamine may be condensed with a meta-hydroxy-hydroxyalkyl-arylamine or with a meta-hydroxy-hydroxyalkyl-alkyl-arylamine.

The standard reactions for the manufacture of thiazine dyestuffs are as follows: A nitroso-derivative of an hydroxyalkyl-arylamine or of an hydroxyalkyl-alkyl-arylamine may be converted into the corresponding p-diamine thiosulphonic acid by treatment with thiosulphate in the usual manner, and this oxidized together with an alkyl-arylamine, an hydroxyalkyl-arylamine, or an hydroxyalkyl-alkyl-arylamine. Or again, a p-diamine thiosulphonic acid obtained from a p-nitroso-alkyl-arylamine may be oxidized together with an hydroxyalkyl-arylamine or an hydroxyalkyl-alkyl-arylamine.

The standard reactions for the manufacture of azine dyestuffs are as follows: A nitroso derivative of an hydroxyalkyl-arylamine or of an hydroxyalkyl-alkyl-arylamine may be condensed with an hydroxyalkyl-m-diamine or other N-substituted m-diamine.

Or again, a nitroso-derivative of an alkyl-arylamine may be condensed with an hydroxyalkyl-m-diamine. In each case there is formed an intermediate indamine which can be converted into the azine in the usual way. Further, as is general in the azine series, the condensation of the nitroso compound with the m-diamine may be replaced by the conjoint oxidation of the latter together with the respective p-diamine obtained by reduction of the nitroso compound; and lastly, azine dyestuffs of this class may be obtained by the oxidation of a mixture of a para-diamine with two arylamines, the first of which is primary, while hydroxyalkyl groups may replace one or more hydrogen atoms either in the amino groups of the second arylamine or in one of the amino groups of the p-diamine.

In addition to the above general methods of preparation, and such known equivalents as the use of azo or quinonimide derivatives in place of nitroso derivatives, the hydroxyalkyl group may be introduced into dyestuffs of this type by subsequent condensation with components, such as hydroxyalkyl diamines, which contain this group attached to one nitrogen, while the other amino group is unsubstituted.

This last method is especially applicable to the oxazines of the gallocyanine type.

The following examples will serve to illustrate further the nature of the invention, but we do not bind ourselves to the details therein contained.

Oxazines.

*Example 1.*—Hydroxyethylamino-dihydroxy-carboxamido-toluphenoxazonium-chloride.

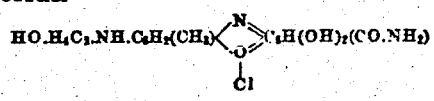

10 parts of gallamide are dissolved in 100 parts of a mixture of 45 parts of benzene and 80 parts of ethyl alcohol. The solution is boiled and 11.6 parts of nitroso-hydroxyethyl-o-toluidine hydrochloride are added in three equal portions at intervals of about an hour.

After 3 to 3½ hours boiling the solution is cooled and allowed to stand for 12 hours. The dye is collected, being obtained as green crystals, and is dried at a moderate temperature. It dyes chromed wool a level purple.

The above mentioned nitroso-hydroxyethyl-o-toluidine hydrochloride is obtained from hydroxyethyl-o-toluidine (D. R. P. 163043) by dissolving the amine in dilute hydrochloric acid, cooling, adding one equivalent of sodium nitrite slowly with stirring and separating the nitrosamine so obtained. This is run with strong cooling and agitation into its own volume of concentrated hydrochloric acid. On keeping the solution cold for some hours the nitroso-o-toluidine hydrochloride crystallizes in shining yellow needles.

*Example 2.*—Hydroxyethel-ethyl-amino-dihydroxy-phenoxazonium carboxylate.

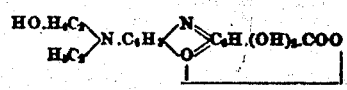

10 parts of gallic acid are dissolved in 200 parts of a mixture of 45 parts of benzene and 80 parts of ethyl alcohol. The solution is boiled and 19 parts of nitroso-hydroxyethel-ethyl-aniline hydrochloride are added in three equal portions at intervals of about one hour.

After 3 to 3½ hours boiling the solution is cooled and allowed to stand for 12 hours. The dyestuff is collected and dried, being thus obtained as dull green crystals readily soluble in water. It dyes chromed wool a sky blue shade and can also be applied as an acid dye with after-chroming. It is also useful for printing.

In a manner analogous to the above, other nitroso derivatives of the hydroxyalkyl aromatic amines may be condensed with gallic acid, or its amide or anilide.

*Example 3.*—Dyestuff obtained by the condensation of celestine blue with asym-dihydroxyethyl-p-phenylene-diamine.

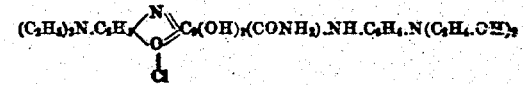

4 parts of celestine blue, 12 parts of asym-dihydroxyethyl-p-phenylene diamine and 1 part of dinitrobenzene are heated to 70° C. for 3 to 4 hours, the melt being well mixed. 30 parts of ethyl alcohol are added and the solution allowed to stand for 12 hours. The dye separates and is obtained as a bronzy powder. The amount can be increased by adding about 12 parts of benzene. It is much more soluble in water than the corresponding anthracyanine and has a greener shade than the celestine blue.

The asmy-di-hydroxyethyl-p-phenylene diamine is obtained from acetyl-p-phenylene diamine by the method of D. R. P. 163043 by boiling with excess of an aqueous solution of chlorhydrin together with the theoretical amount of chalk to remove the hydrochloric acid produced, concentrating, removing the acetyl group by hydrolysis and extracting the diamine from its aqueous solution with butyl alcohol. The butyl alcohol is then removed by evaporation.

In an analogous manner either ordinary alkylated gallocyanines, or the hydroxyalkylated gallocyanines mentioned in Examples 1 and 2 above, or gallocyanines containing both hydroxyalkyl and alkyl groups may be condensed with unsymmetrical dihydroxyalkyl- or hydroxyalkyl-alkyl-m- or p-diamines, the products having the great advantage that by adjusting the number of the hydroxy groups the solubility in water can be increased to any extent desired. Hydroxyalkylated gallocyanines can also be condensed with primary arylamines or phenols.

*Example 4.*—Hydroxyethyl-diethyl-diamino-naphtho-phenoxazonium chloride.

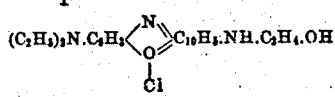

25 parts of nitroso-diethyl-m-aminophenol hydrochloride and 15 parts of hydroxyethyl-alpha-naphthylamine hydrochloride (prepared according to D. R. P. 163043 by condensation of alpha-naphthylamine with ethylene chlorhydrin) or the corresponding quantity of pure base, are boiled together in 300 parts of ethyl alcohol for about one hour. Reaction is complete when a drop spotted on filter paper no longer shows a green rim. About 11 parts of 55% zinc chloride solution is then added and the solution allowed to stand for at least 24 hours, crystallization being slow. The dye is then collected, washed with a little alcohol and air-dried. It is obtained as bronzy crystals or powder. It dyes tannined cotton almost the same shade as Nile blue 2$^B$ but possesses the advantage over the latter of greatly increased solubility.

*Example 5.*—Dihydroxyethyl-benzyl-diamino-naphtho-phenoxazonium chloride.

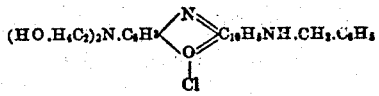

29.5 parts of dihydroxyethyl-m-aminophenol are dissolved in 50 parts of warm ethyl alcohol. To this is added 45 parts of 25% alcoholic hydrochloric acid and the whole cooled to below 0° C. 10.4 parts of sodium nitrite are made into a paste with water and added to the alcoholic solution in small portions over a period of 4 hours with mechanical stirring. The solution is stirred a further two hours, the temperature raised to 50° C., the salt produced in the nitrosation filtered out and washed clean with alcohol. The nitroso solution so obtained is added to a warm solution of 20 parts of benzyl-alpha-naphthylamine in 50 parts of alcohol and the total volume made up to 272–300 parts of alcohol. On refluxing this solution for about an hour the reaction is completed and the dye-stuff begins to separate as green crystals. After standing for 24 hours, it is collected, washed with a small quantity of alcohol and obtained as a mass of green crystals. The dyestuff is readily soluble in water and dyes tannined cotton nearly the same shade as the preceding example.

The di-hydroxyethyl-m-amino-phenol employed is easily prepared according to D. R. P. 163043 by boiling m-amino-phenol with excess of aqueous ethylene chlorhydrin together with the theoretical amount of chalk necessary to remove the hydrochloric acid produced, concentrating, and extracting with butyl alcohol followed by the removal of the solvent by evaporation.

The intermediate nitroso-dihydroxyethyl-m-amino-phenol hydrochloride, obtained as above, may be condensed in the same manner with 14.8 parts of hydroxyethyl-alpha-naphthylamine, or with 13 parts of alpha-naphthylamine to give very soluble bright blue dyes. Further, dihydroxyethyl-m-amino-p-cresol may be converted to the nitroso compound in the manner described for dihydroxyethyl-m-amino-phenol and then condensed with the above bases to give similar dyes of purple shades.

*Example 6.*—Hydroxyethyl-amino-naphtho-toluphenoxazonium chloride.

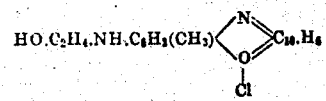

14.4 parts of β-naphthol are dissolved in 50 parts of ethyl alcohol and to the boiling solution is added a solution in 50 parts of ethyl alcohol of 33.4 parts of nitroso-hydroxyethyl-o-toluidine hydrochloride during a period of one hour. The solution is refluxed for a further hour and allowed to cool. The dye crystallizes in masses of bronzy needles. It is readily soluble in water and dyes tannined cotton in redder shades than Meldola's blue.

*Azines.*

*Example 7.*—Hydroxyethyl-diamino-p-tolyl-tolazonium chloride.

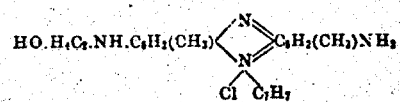

21.2 parts of p-tolylamino-o-toluidine are dissolved in 300 parts of ethyl alcohol and the solution cooled to 0–5° C. To this solution is added with stirring, 33.4 parts of nitroso-hydroxyethyl-o-toluidine hydrochloride. Indamine formation is complete in about an hour; the solution is then refluxed for a further hour. The dyestuff crystallizes on cooling and is obtained as a red powder. It is very readily soluble in water and dyes tannined cotton in fast scarlet shades.

*Example 8.*—Hydroxyethyl-benzyl-diamino-p-tolyl-tolazonium chloride.

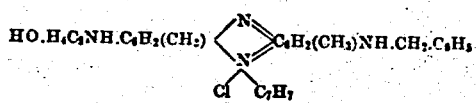

30.2 parts of 4-p-tolyl-2-benzyl-toluylene-m-diamine are dissolved in 1,000 parts of alcohol and the solution cooled to 0–5° C. 33.4 parts of nitroso-hydroxyethyl-o-toluidine hydrochloride are added to this solution with stirring. When indamine formation is complete, the solution is refluxed and finally the solvent distilled off until the volume is reduced to 100 parts. The dyestuff crystallizes on cooling, being thus obtained as a dark red crystalline mass.

It is more soluble than brilliant rhoduline red and dyes the same shade.

*Example 9.*—Dihydroxyethyl-dimethyl-diamino-phenazonium chloride.

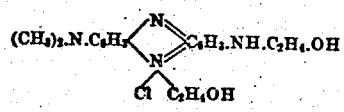

9.8 parts of sym-dihydroxyethyl-m-phenylene diamine, prepared by boiling a solution of m-phenylene diamine with ethylene chlorhydrin in presence of chalk, are dissolved in 60 parts of water and 14 parts of nitroso-dimethylaniline hydrochloride added slowly to the cooled solution. This is then gradually heated to 80° C. and held at this temperature until the conversion of indamine to azine is complete. After cooling, zinc chloride and salt solution are added whereby the dyestuff is obtained as its zinc chloride double salt. It is a dark powder with bronze reflex, dyeing tannined cotton a violet shade.

In the same manner dihydroxyethyl-dimethyl-diamino-tolyl-phenazonium chloride is obtained by condensing 10.5 parts of sym-dihydroxyethyl-m-toluylene diamine, prepared as above from m-toluylene diamine and ethylene chlorhydrin, with 14 parts of nitroso-dimethylaniline hydrochloride; while dihydroxyethyl-diethyl-diamino-toluphenoxazonium chloride is obtained by condensing 10.5 parts of sym-dihydroxyethyl-m-toluylene diamine with 16.1 parts of nitroso-diethylaniline hydrochloride. Both dye tannined cotton in purple shades.

*Example 10.*—Dihydroxypropyl-dimethyl-diamino-phenazonium chloride.

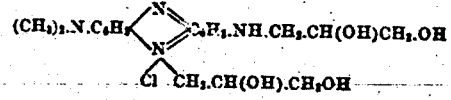

12.8 parts of sym-dihydroxypropyl-m-phenylene diamine are dissolved in 60 parts of water and 14 parts of nitroso-dimethylaniline added to the cooled solution. This is then gradually heated to 80° C. until conversion of the indamine is complete when the dyestuff is collected after adding zinc chloride and salt. It has the same properties as the product of Example 9, except that it has a higher solubility.

The sym-dihydroxypropyl-m-phenylene diamine employed in this preparation is prepared by boiling a solution of glycerol monochlorhydrin with m-phenylene diamine in the presence of the exact amount of chalk necessary to remove the hydrochloric acid produced.

*Example 11.*—Hydroxyethyl-dimethyl-diamino-phenazonium chloride.

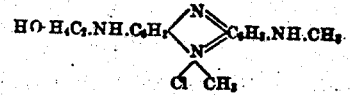

13.2 parts of sym-dimethyl-m-phenylene diamine are dissolved in dilute acetic acid and to the cooled solution 21.1 parts of nitroso-hydroxyethylaniline hydrochloride are added. When indamine formation is complete, the solution is heated to 80° C. and held at that temperature until the azine has been formed. The dyestuff is salted-out and obtained as a dark powder which dyes tannined cotton in purple shades.

The nitroso-hydroxyethyl-aniline is prepared in a similar manner to the nitroso-hydroxyethyl-o-toluidine mentioned in Example 1.

*Example 12.*—Dihydroxyethyl-amino-hydroxy-phenazonium chloride.

3 parts of nitroso-phenol are dissolved in 200 parts of water and mixed with a solution of 8.1 parts of sym-dihydroxyethyl-m-phenylene diamine in 200 parts of water. 25 parts of glacial acetic acid are added and the whole heated on the water-bath for 3 to 4 hours. The dyestuff separates on cooling, and after collecting and drying it is obtained as a dark powder. It dyes tannined cotton purple but is chiefly valuable as an intermediate for other colouring-matters.

Thiazines.

*Example 13.*—Dihydroxyethyl-diamino-toluthiazonium chloride.

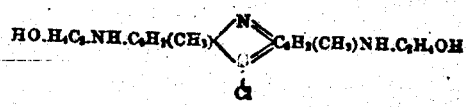

10.8 parts of nitroso-hydroxyethyl-o- toluidine hydrochloride are dissolved in 100 parts of dilute hydrochloric acid and reduced with zinc dust. The colourless neutral solution is filtered from unused zinc and transferred to a vessel in which it can be stirred and rapidly heated by injected steam. There is then added to it in succession with stirring—25 parts of 50% zinc chloride solution, 1 part of concentrated sulphuric acid, 9.5 parts of aluminum sulphate dissolved in 15 parts of water, 13 parts of sodium thiosulphate dissolved in 15 parts of water, and 4.75 parts of sodium dichromate dissolved in 7 parts of water. By means of steam the temperature is rapidly raised to 40° C. and then there is added 7.5 parts of hydroxyethyl-o-toluidine dissolved in 7 parts of concentrated hydrochloric acid followed by 9.5 parts of sodium bichromate in 15 parts of water. The temperature is raised to 70° C. and 8.9 parts of 70% manganese dioxide as a fine paste is added, after which the temperature is again raised to 85° C. and maintained there for 30 minutes. After cooling to 30° C., 15 parts of concentrated sulphuric acid are added, and after further cooling the crystalline zinc chloride double salt of the dyestuff is collected and dried. It is a bronze powder, readily soluble in water and dyeing tannined cotton a reddish shade of blue.

In the same manner, using equivalent parts, other hydroxyalkyl-asym-p-diamines can be condensed with hydroxyalkyl-arylamines or alkylarylamines, and conversely asym-dialkyl-p-diamines may be condensed with hydroxyalkyl-arylamines.

*Example 14.*—Internal salt of hydroxyethyl-ethyl-amino-1:2: dihydroxy-6-sulphonaphtho-phenthiazine.

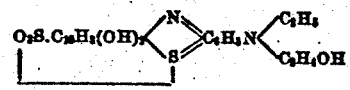

48 parts of sodium thiosulphate are dissolved in 400 parts of water and to this are added a solution containing 19.4 parts of nitroso-hydroxyethyl-ethyl-aniline hydrochloride followed by 50 parts of 30% acetic acid. The mixture is stirred at 80° C. for an hour and then a paste of 16.7 parts of nitroso-Schaeffer acid is added at 36° C. This temperature is maintained for 8 hours with continued stirring, then, after adding 100 parts of salt, it is increased to 50° C. for 5 hours, to 55° C. for 4 hours, to 60° C. for 4 hours, and finally to 80° C. for 3 hours. The dyestuff which separates is filtered from the warm solution. The filter cake is dissolved in dilute caustic soda, filtered, reacidified and lightly salted. The purified dyestuff is obtained as a bronze powder, readily soluble in warm water and dyeing wool navy blue from an acid bath.

The above mentioned nitroso-hydroxyethyl-ethylaniline is obtained from the hydroxyethyl-ethylaniline of D. R. P. 163043 by dissolving 8 parts in 15 parts of concentrated hydrochloric acid and adding a strong solution of 3.5 parts of sodium nitrite with strong cooling. The nitroso-hydroxyethyl-ethylaniline hydrochloride separates as a stiff mass of minute yellow crystals which are collected, pressed and dried.

What we claim and desire to secure by Letters Patent is:—

1. The process of manufacturing dyestuffs of the quinonimide class possessing the constitution derived from the following formula—

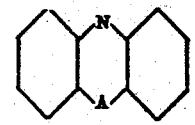

in which A stands for nitrogen, oxygen or sulphur, by applying a standard reaction for the preparation of oxazines, thiazines and azines, to intermediates containing at least one hydroxyalkyl group attached to nitrogen in turn attached to one of the benzene rings, substantially as described.

2. The new hydroxyalkyl dyestuffs possessing a quinonimide structure which possess the constitution indicated by the following formula—

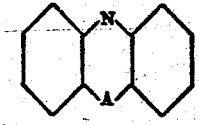

in which A stands for oxygen, nitrogen or sulphur, with at least one amino group with an hydroxyalkyl group attached to it, attached to at least one of the benzene rings, and which are readily converted into soluble acid sulphato dyestuffs by treatment with concentrated sulphuric acid, which dyestuffs by hydrolysis readily split off sulphuric acid.

3. The new oxazine dyestuffs possessing the constitution indicated by the following formula—

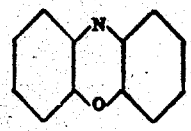

with at least one amino group with an hydroxyalkyl group attached to at least one of the benzene rings, and which on treatment with sulphuric acid gives a soluble acid sulphato dyestuff, which dyestuff by hydrolysis readily splits off sulphuric acid.

4. The new hydroxyalkylated Nile blue dyestuff, namely, hydroxy-ethyl-diethyl-diamino-naphtho-phenoxazonium chloride with the constitution indicated by the following formula—

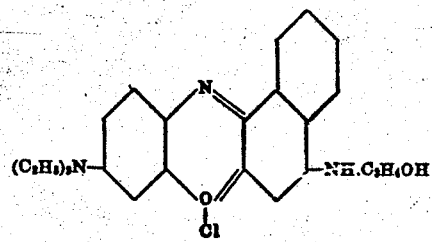

which is readily converted into the acid sulphato dyestuff by treatment with concentrated sulphuric acid and this acid sulphuric ether splits off sulphuric acid on hydrolysis.

In testimony whereof we have signed our names to this specification.

ARTHUR GEORGE GREEN.
KENNETH HERBERT SAUNDERS.
ERNEST BRYAN ADAMS.